United States Patent
Schrenk

Patent Number: 5,889,266
Date of Patent: Mar. 30, 1999

[54] DATA TRANSFER SYSTEM HAVING A TERMINAL AND A PORTABLE DATA CARRIER CONFIGURATION AND METHOD FOR RECHARGING THE PORTABLE DATA CARRIER CONFIGURATION USING THE TERMINAL

[75] Inventor: Hartmut Schrenk, Haar, Germany

[73] Assignee: Siemens Aktiengesellschaft, Munich, Germany

[21] Appl. No.: 828,720

[22] Filed: Mar. 31, 1997

Related U.S. Application Data

[63] Continuation of PCT/DE95/01286, Sep. 19, 1995.

[30] Foreign Application Priority Data

| Sep. 30, 1994 | [DE] | Germany | 44 35 137.2 |
| Nov. 3, 1994 | [DE] | Germany | 44 39 266.4 |

[51] Int. Cl.$^6$ .................................................. G06K 5/00
[52] U.S. Cl. ........................ 235/380; 235/492; 235/379
[58] Field of Search ................... 235/492, 380, 235/379

[56] References Cited

U.S. PATENT DOCUMENTS

| 4,809,225 | 2/1989 | Dimmler et al. | 365/145 |
| 4,853,526 | 8/1989 | Effing | 235/492 |
| 4,864,109 | 9/1989 | Minematsu et al. | 235/379 |
| 5,001,332 | 3/1991 | Schrenk | 235/492 |
| 5,225,664 | 7/1993 | Iijima | 235/380 |
| 5,297,077 | 3/1994 | Imai et al. | 365/145 |

FOREIGN PATENT DOCUMENTS

| 0268106A3 | 5/1988 | European Pat. Off. . |
| 0321727B1 | 6/1989 | European Pat. Off. . |
| 0398545A1 | 11/1990 | European Pat. Off. . |
| 0409701A1 | 1/1991 | European Pat. Off. . |
| 2667192 | 3/1992 | France . |
| 2689662 | 10/1993 | France . |
| 2701578 | 8/1994 | France . |
| 3638505A1 | 5/1988 | Germany . |
| 4230866A1 | 3/1994 | Germany . |

*Primary Examiner*—Anita Pellman Gross
*Assistant Examiner*—Jared J. Fureman
*Attorney, Agent, or Firm*—Herbert L. Lerner; Laurence A. Greenberg

[57] ABSTRACT

In a data transfer system having at least one terminal and at least one portable data carrier configuration, for example a chip card, and a method of recharging the portable data carrier configuration through the use of the terminal, an area of a non-volatile memory of the card representing a monetary value is subdivided into two value areas of which only one is activatable into a non-volatile state and the other can only be activated temporarily in each case. When the card is recharged, the new counter status is written into the value area which has initially only been activated temporarily. It is only after checking the correct writing that this value area is switched in such a way that it is activatable into a non-volatile state.

33 Claims, 1 Drawing Sheet

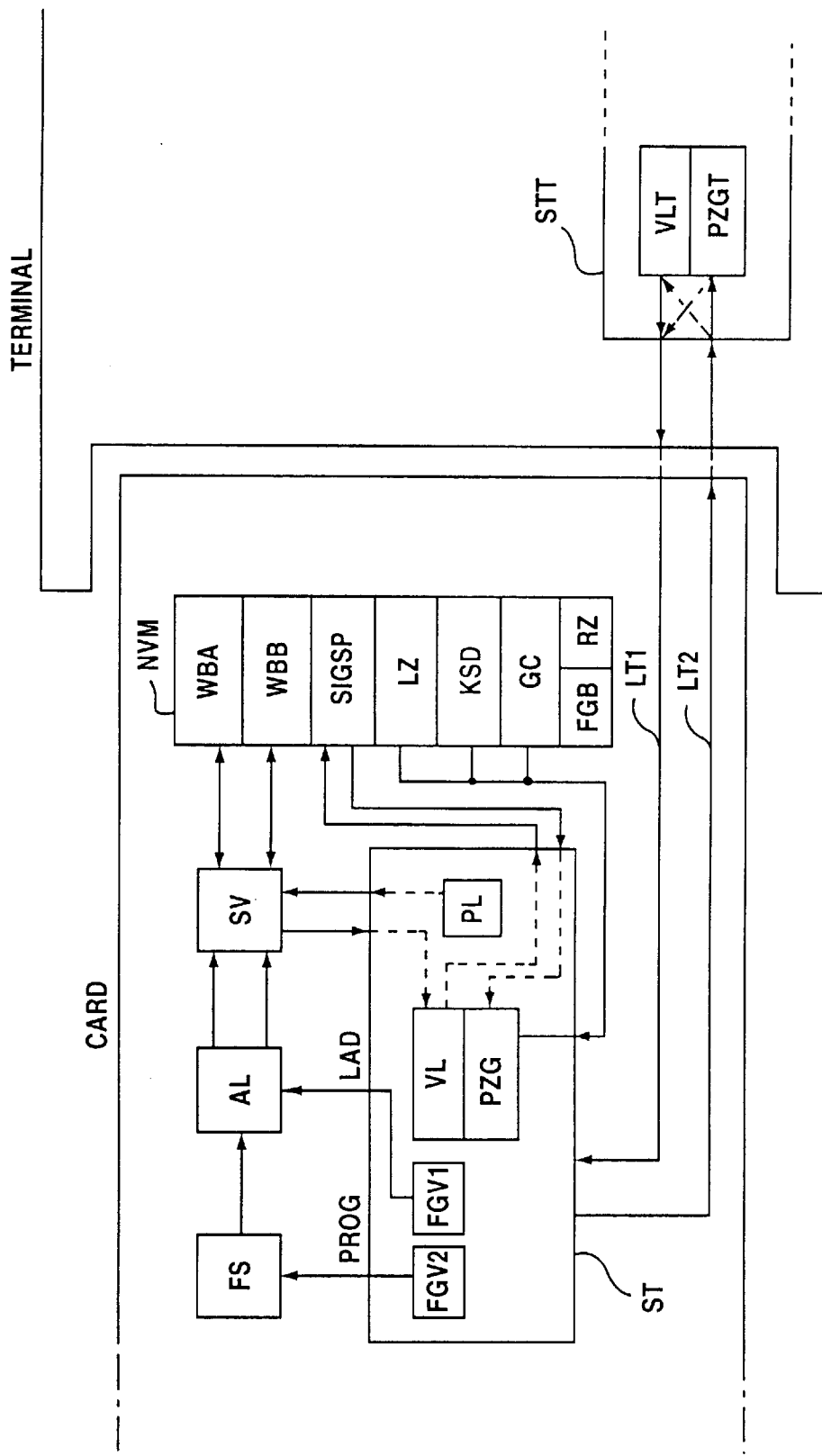

5,889,266

DATA TRANSFER SYSTEM HAVING A TERMINAL AND A PORTABLE DATA CARRIER CONFIGURATION AND METHOD FOR RECHARGING THE PORTABLE DATA CARRIER CONFIGURATION USING THE TERMINAL

CROSS-REFERENCE TO RELATED APPLICATION

This application is a Continuation of International Application No. PCT/DE95/01286, filed Sep. 19, 1995.

BACKGROUND OF THE INVENTION

Field of the Invention

The invention relates to a data transfer system having at least one terminal and at least one portable data carrier configuration which is provided with a non-volatile semiconductor memory that has at least a first value area acting as a counter and representing a debatable monetary value. The invention also relates to a recharging method for the value area of the portable data carrier configuration.

Such a portable data carrier configuration is, for example, a currently customary chip card, which is used, for example, as a phonecard. In that case, the stationary terminal is a card-compatible telephone set. Such chip cards constructed as simple memory cards contain a non-volatile semiconductor memory, for example an EEPROM, which acts essentially as a counter for the prepaid telephone units to be debited. The EEPROM in that case may be wired, for example, in accordance with European Patent 0 321 727 B1, corresponding to U.S. Pat. No. 5,001,332, so that it operates as a multistage abacus-like counter. The value of the card, and consequently the counting extent of the counter, is established by writing to and consequently blocking the areas of the counter which are no longer authorized. Before that establishing operation, the counter always has the maximum counting extent. Currently customary phonecards can be used only once and are discarded after use. However, the use of such chip cards as an electronic wallet is also under discussion. Chip cards which can be used for that purpose are only worthwhile if they are rechargeable, that is to say if the counter status can be incremented again after a certain amount has been debited. That increasing of the counter status takes place at special charging terminals, at which the user can credit his or her card by a certain amount either by cash payment, through the use of a credit card or by specifying an account number. When recharging the counter of a chip card, it may be necessary due to the construction of EEPROMs to initially clear a larger counting area or the entire counter, that is to say too high a counting extent may be temporarily set. It is only thereafter that the new counter status can be set by renewed restriction of the counting extent through programming operations.

If a user draws the card out of the terminal in the time between the clearing of the counter and the renewed programming, he or she would have too high an amount credited, as a result of which improper manipulation is made possible. It is also conceivable for a user to manipulate the data traffic between the terminal and the card, so that in such a way too high an amount may be credited.

The manipulation of the data on the transmission path could be prevented by a so-called electronic signature. The data to be transmitted can also be encoded through the use of a secret key and can only be decoded by a particular key uniquely assigned to the sender of the data, as a result of which the sender is definitively identifiable and the data cannot be manipulated, since the encoding key is secret. However, such encoding and decoding require a complex and very fast arithmetic unit, which is possible only with expensive microprocessors, such as are used, for example, in already known cryptocards.

Published European Patent Application 0 398 545 A1 describes a method and a configuration for storing data in a nonvolatile memory which has at least two areas, into which successive data are alternately written. In that case, each memory area can be identified as the memory which is valid at a specific point in time, for example the switching-on time, by a flag that can be set into a non-volatile state. Since each memory is assigned its own flag, which can assume two states, it may happen that both flags assume the same state. Therefore, it is necessary in the case of the known method and the known configuration to determine the actually valid state by an "arbitration" logic.

In the known configuration, in the "normal case" of memory operation both flags always assume the same set state at a specific point in time, but the flag which was not set last will be reset. However, that requires that a writing operation and an erasing operation are always necessary, which additionally takes time.

SUMMARY OF THE INVENTION

It is accordingly an object of the invention to provide a data transfer system having a terminal and a portable data carrier configuration and a method for recharging the portable data carrier configuration using the terminal, which overcome the hereinafore-mentioned disadvantages of the heretofore-known devices and methods of this general type and in which a manipulation-proof recharging of a counter of the portable data carrier configuration is possible quickly and with simple circuitry.

With the foregoing and other objects in view there is provided, in accordance with the invention, a data transfer system, comprising at least one terminal; and at least one portable data carrier configuration including a non-volatile semiconductor memory having a first value area acting as a counter and representing a debitable monetary value and a second value area acting as a counter; a selection logic circuit connected to the value areas; and a non-volatile flag memory connected through the selection logic circuit to the value areas, the non-volatile flag memory assuming only two states; the respective state of the flag memory determining which one of the two value areas is capable of being enabled into a non-volatile state for reading out and counting but is inhibited for charging, the other respective value area is temporarily only capable of being enabled into a volatile state for charging, and at each point in time only one of the value areas is enabled.

The meaning which is used herein of being activatable into a non-volatile state is that the information regarding which of the two value areas was last defined as the value area from which debiting could be performed is retained even after switching off the operating voltage or in the event of an interruption of the charging operation. This means that an only temporarily activated value area is deactivated again after switching off the operating voltage or interruption of the charging operation and switching on again of the operating voltage or recommencement of a charging operation and has to be temporarily activated once again. It is only after successful and correct recharging of the chip card, i.e. only after correct restricting of the counting extent of the only temporarily activated value area in accordance with the sum of the residual value and a value to be credited which has been input into the terminal, that the only temporarily activated value area is switched in such a way that it is activatable into a non-volatile state, as a result of which the value area previously activated into a non-volatile state is deactivated and initially can only be temporarily activated for a new charging operation.

Thus, if an attempt were made by a defrauder during the charging operation of the only temporarily activated value area, to remove the card from the terminal after the clearing of the counter and before the renewed limiting of its counting extent in accordance with the value to be input, when next used, that is to say when the operating voltage is next applied, the value area which is activatable into a nonvolatile state would continue to be activated and the value area which previously was only temporarily activated would be deactivated.

It is an advantageous development of the invention that the value areas of the non-volatile memory are connected through the selection logic circuit to the non-volatile flag memory, the state of which determines the value area that is activated into a non-volatile state. When the operating voltage is switched off, the state of the non-volatile flag memory is retained, with a particular state always being assigned to the same value area.

In accordance with another feature of the invention, in order to temporarily activate the other value area in each case, the selection logic circuit is subjected to a charging control signal. This charging control signal has in its neutral state, i.e. the state after applying the operating voltage, for example a logical "0" level and, for temporarily activating the value area to be newly charged, it is correspondingly switched over to a "1" level.

In accordance with a further feature of the invention, the output signal or signals drive a switching device which connects the value areas to a programming logic circuit and to a verifying logic circuit. A value area is thus activated by being connected to the programming logic circuit and to the verifying logic circuit.

In accordance with an added feature of the invention, the at least one portable data carrier configuration includes a first enabling device allowing generation of the charging control signal only after a positive authentication of the at least one terminal.

In accordance with an additional feature of the invention, the non-volatile flag memory receives a programming signal initiating a transformation of the temporarily enablable value area into the value area capable of being enabled into a non-volatile state.

In accordance with yet another feature of the invention, the at least one portable data carrier configuration includes a second enabling device allowing generation of the programming signal only after a positive authentication of the at least one terminal.

In accordance with yet a further feature of the invention, the non-volatile semiconductor memory has an enabling area acting as a non-volatile counting device and in which every attempt to accomplish the enabling is registerable in a nonvolatile state and is distinguishable from successive enabling procedures.

With the objects of the invention in view there is also provided a method for using a terminal of a data transfer system to recharge a portable data carrier configuration, which comprises a) reading an old counter status of a value area having been enabled into a non-volatile state from the portable data carrier configuration with the terminal; b) calculating a new counter status in the terminal from the old counter status and data to be credited having been input into the terminal; c) transferring the new counter status from the terminal to the portable data carrier configuration; d) writing the new counter status into the value area of the non-volatile memory having been activated only into a volatile state by a charging control signal; and e) altering the state of the flag memory so that the value area with the new counter status becomes capable of being enabled into a non-volatile state.

In accordance with another mode of the invention, there is provided a method which comprises carrying out the following steps after step d), d1) signing the new counter status in the portable data carrier configuration and transferring the signature to the terminal; d2) determining the signature of the new counter status in the terminal and comparing of the two signatures; and carrying out step e) only after the two signatures match and abnormally terminating the method if the two signatures do not match.

In accordance with a further mode of the invention, there is provided a method which comprises carrying out the following steps after step a), a1) reading data specific for the portable data carrier configuration from the portable data carrier configuration, with the terminal; a2) generating a challenge and determining a response in the terminal from the challenge and at least some of the specific data and the old counter status; a3) transmitting the challenge and the response by the terminal for the portable data carrier configuration; and a4) determining a response from the challenge in the portable data carrier configuration and comparing the two responses.

In accordance with an added mode of the invention, there is provided a method which comprises carrying out the following steps after step d) or d2), d3) reading data specific for the portable data carrier configuration from the portable data carrier configuration, with the terminal; d4) generating a challenge and determining a response in the terminal from the challenge and at least some of the specific data and the old counter status; d5) transmitting the challenge and the response by the terminal for the portable data carrier configuration; d6) determining a response from the challenge in the portable data carrier configuration and comparing the two responses; and proceeding with step e) only if the two responses match and abnormally terminating the method if they do not match.

In accordance with an additional mode of the invention, there is provided a method which comprises using a datum altering with every charging operation for signing a counter status or for generating a response, and generating a signature or a response with a pseudo-random generator.

In accordance with yet another mode of the invention, there is provided a method which comprises outputting the datum as a value of a charging counter counting every charging operation.

In accordance with yet a further mode of the invention, there is provided a method which comprises outputting the datum as a value of a signature memory to which the signature of the old value of the value area which is respectively capable of being enabled into a non-volatile state, is written.

In accordance with yet an added mode of the invention, there is provided a method which comprises outputting the datum as a value of a signature memory into which a new value is written through the charging terminal as the signature of the charging operation in the case of every new charging operation.

In accordance with a concomitant mode of the invention, there is provided a method which comprises altering a response counter into a non-volatile state and using the non-volatile state as the altering datum, before every response calculation.

Other features which are considered as characteristic for the invention are set forth in the appended claims.

Although the invention is illustrated and described herein as embodied in a data transfer system having a terminal and a portable data carrier configuration and a method for recharging the portable data carrier configuration using the terminal, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The figure of the drawing is a diagrammatic view of a charging terminal and a portable data carrier configuration introduced into the charging terminal, in which circuit configurations of the two parts of the data transfer system that are essential for the invention are represented in the form of a block diagram.

DESCRIPTION OF THE PREFERRED EMBODIMENTS

Referring now in detail to the single figure of the drawing, there is seen a portable data carrier configuration, which is referred to below as a card although other configurations are also conceivable, for example a key, and which is introduced into a charging terminal of a data transfer system. The card contains a non-volatile memory NVM, which may be realized in an advantageous way by an EEPROM. This memory NVM in this case is subdivided into a plurality of areas, of which two areas WBA, WBB act as value areas. These value areas WBA, WBB are constructed in an advantageous way as multistage counters and are wired, for example, in accordance with European Patent 0 321 727 B1, corresponding to U.S. Pat. No. 5,001,332. Such counters are downward counters if, in the cleared, or charged state, they have the logical state "1" and consequently a maximum counting extent, determined by the number of counting stages and bits per stage. The counting extent can be restricted and counting down can be performed from this desired value to the final value "0" by writing to a suitable number of upper stages or some bits of the lowermost of these upper stages.

The value areas WBA, WBB are connected through a switching device SV to a programming logic circuit PL and to a verifying logic circuit VL. The programming logic circuit PL and the verifying logic circuit VL in this case are component parts of a control device ST. Within the control device ST, connecting lines of switching parts are represented by dashed lines, whereby the intention is to indicate that the respective connecting line to the control device ST may also be connected within the control device ST to other non-illustrated parts of the control device ST.

The programming logic circuit PL serves for programming or writing to the value areas WBA, WBB and the verifying logic circuit VL serves for verifying or checking the areas written to as to whether they have been correctly written to. In an advantageous way, the verifying logic circuit VL also serves for generating an electronic signature of a value state.

The switching device SV is driven by a selection logic circuit AL in such a way that only one of the value areas WBA, WBB in each case is connected to the programming logic circuit PL and the verifying logic circuit VL and is activated as a result. The selection logic circuit AL for its part is driven by a flag memory FS and through the use of a charging control signal LAD from the control device ST. The selection logic circuit AL may be formed, for example, by an EXOR gate with a non-inverting output and an inverting output. The flag memory FS is a non-volatile memory and is driven through the use of a signal PROG from the control device ST. The flag memory FS may assume two states, each of which states is assigned to one of the value areas WBA, WBB. Since the state of the flag memory FS is stored in a nonvolatile state, the value area WBA or WBB corresponding to the respectively stored state is activated when the operating voltage is applied to the card, i.e. for example by introducing the card into the charging terminal. For this purpose, the charging control signal LAD assumes a defined state when the operating voltage is applied. It is only after altering the state of the charging control signal LAD that the other value area WBB or WBA in each case is temporarily activated, and the previously activated value area WBA or WBB is deactivated, through the use of the switching device SV, which is correspondingly driven by the selection logic circuit AL. This is temporary because the state of the charging control signal is volatile and resumes its defined inactive state when the operating voltage is switched off, which takes place, for example, by removing the card from the charging terminal, so that after every switching off of the operating voltage or, according to the invention, after every interruption of a charging operation, the value area defined by the flag memory FS is again activatable or activated.

An altering of the state of the flag memory, and consequently the exchanging of the activated or activatable value area into a non-volatile state, can be carried out by the signal PROG from the control device ST to the flag memory FS.

The non-volatile memory NVM contains further areas, namely a signature memory SIGSP which is explained below, a charging counter LZ with which charging operations can be counted, an area KSD in which card-specific data are stored, and an area GC in which a secret code is stored.

The control device ST also contains a pseudo-random generator PZG which is in operative connection with the verifying logic circuit VL and is also connected to the signature memory SIGSP, to the charging counter LZ, to the area KSD and to the secret-code area GC of the non-volatile memory NVM. This pseudo-random generator PZG is constructed in an advantageous way in accordance with Published European Patent Application 0 616 429 A1.

The charging terminal contains a control device STT, which likewise contains a verifying logic circuit VLT and a pseudo-random generator PZGT. The two pseudo-random generators PZG and PZGT must be identical if the card and the terminal are genuine. The control device ST of the card and the control device STT of the terminal are in connection with each other through lines LT1, LT2, in order to be able to exchange data.

At the beginning of a charging operation, the terminal reads the card-specific data, the current status of the activated and consequently debitable value area WBA or WBB as well as the status of the charging counter LZ and of the signature memory SIGSP. A genuine terminal can determine the secret code of the card from the card-specific data, for example through the use of a table. These data as well as a further random number, the so-called challenge, are input in the terminal into the pseudo-random generator PZGT, which calculates a response. Both the challenge and the response are then transmitted to the card. A response is calculated there, likewise on the basis of the data, and is compared through the use of a comparator, which is likewise contained in the control device ST, with the response transmitted from the terminal. If they match, the terminal has proved to be genuine, since it was capable on one hand of determining the correct secret code, and also has the correct pseudo-random generator PZGT.

The pseudo-random generator PZG or PZGT also serves the purpose of generating an electronic signature of the content of the value areas WBA, WBB, that is to say their counter statuses. Since the output signal of the pseudo-random generator depends on the secret code of the card and can only be re-calculated with this secret code, the same secret code must have been used if output signals of the pseudo-random generator PZG or PZGT match. Consequently, the output signal of a pseudo-random generator can be uniquely assigned to a particular card, which is referred to as the signature of the card under the counter status.

In order to ensure that the construction of the pseudo-random generator and the input data cannot be determined by an analysis of a number of calculating operations, one or more of the input data are alterable and also alter with every calculating operation. One of these data is the status of the charging counter LZ, which is incremented by 1 with every new charging operation, and consequently with every new booking operation, and reset whenever the counting extent is exhausted.

Another datum is the content of the signature memory SIGSP. The result of a previous computation of the pseudo-random generator, which is after all a signature of the previous counter status, in each case is written into the memory. It is consequently ensured that there is only a negligible probability that the output signal of the pseudo-random generator PZG is repeated and thus cannot be analyzed.

In a variant of the invention, a new value can be directly written into the signature memory SIGSP as a signature of the charging operation through the charging terminal in the case of every charging operation.

A charging operation according to the invention proceeds in the simplest way in such a way that, after introducing the card into the charging terminal and consequently after applying an operating voltage, the value area WBA or WBB defined by the state of the flag memory FS is activated and is read out from the terminal. The other value area WBB or WBA is temporarily activated and the previously activated area is temporarily deactivated by altering the state of the charging control signal LAD. Then the then-activated value area WBB or WBA is cleared, its counter assuming too great a counting extent. After this, a new counter status is determined in the terminal from its old counter status and from the amount to be credited which has been input by the user into the terminal, and is transferred to the card. If the user were to remove the card from the terminal beforehand, he or she would get too high an amount credited if the programming of the value area were already to have taken place definitively and in a non-volatile state. However, with the procedure according to the invention, by newly introducing the card into the terminal the previous value area WBA or WBB is activated again with the old counter status, since the state of the flag memory FS has not yet been altered. It is only when the new counter status has been programmed into the temporarily activated value area WBB or WBA that the state of the flag memory FS is altered by the signal PROG from the control device ST, as a result of which the new value area is activatable in a non-volatile state and is activated every time the operating voltage is newly applied, that is to say every time the card is introduced into a terminal, for example in order to debit money.

In order to prevent a manipulation of the new counter status during the transfer from the terminal to the card, in accordance with a development of the method according to the invention, after transferring the new counter status to the card, the counter status is signed there in accordance with the method described above. The signature is subsequently transferred to the terminal and compared there with a likewise determined signature. If they match, it is ensured that the correct counter status has been transferred to the card. If they do not match, the charging operation is abnormally terminated, as a result of which the incorrect counter status has no influence on later debiting operations, since the state of the flag memory FS has not yet been altered. The latter is not altered until after it has been detected that the signatures match and after transmission of a corresponding signal from the terminal to the card.

In accordance with a development of the method according to the invention, the terminal must allow itself to be authenticated with respect to the card before a charging operation can be started. This ensures that no incorrect charger can be used for crediting a card. In order to provide this authentication, a response is calculated from the data read from the card by the terminal and from a challenge and this response is transmitted together with the challenge to the card and compared there with a response which is likewise calculated through the use of the challenge and the card data. It is only if the response is matched that the charging control signal LAD as well as the programming signal PROG can be generated, and consequently a charging operation can be commenced. For this purpose, enabling devices FGV1, FGV2, which are suitably driven by the control device ST, are provided in the portable data carrier configuration. Such a charging operation in this case is started, for example, by incrementing the status of the charging counter LZ or by a dummy programming pulse. A dummy programming pulse in this case is a programming pulse to a non-valid address of the non-volatile memory NVM which is detected as a control command by the control device ST of the card.

Even after the start of a charging operation, after the terminal has demonstrated its authorization and the charging signal LAD has been generated, a defrauder could succeed in influencing the value of the counter status and in triggering the programming signal PROG for the non-volatile activation of the counter status independently of the terminal. In accordance with a development of the method according to the invention, the terminal must demonstrate its authorization once again before generation of the programming signal PROG, that is to say it must authenticate itself once again. The generation of the responses in this case corresponds to that in the case of the first authorization checking at the start of a charging operation.

In order to prevent a repetition of responses which are output by the data carrier configuration during signature calculation and which could be used for generating the programming signal PROG, according to the invention a datum altering with every response calculation is used for the generation of a response. This datum is supplied by a response counter RZ, which is altered to a non-volatile state before every response calculation and the counter status of which influences the response calculation. The response counter RZ is realized in an advantageous way as an area of the non-volatile memory.

The non-volatile semiconductor memory NVM also has an enabling area FGB which acts as a non-volatile counting device and in which every attempt to accomplish the enabling is registerable in a non-volatile state and is distinguishable from the successive enabling procedures.

A reliable recharging of a portable data carrier device, for example a chip card, is achieved through the use of the data transfer system according to the invention and the method according to the invention.

I claim:

1. A data transfer system, comprising:
   at least one terminal; and
   at least one portable data carrier configuration including:
      a non-volatile semiconductor memory having a first value area acting as a first counter and representing a debitable monetary value and a second value area acting as a second counter;
      a selection logic circuit connected to said first and second value areas; and
      a non-volatile flag memory connected through said selection logic circuit to said first and second value areas, said nonvolatile flag memory assuming only two states;
         the respective state of said flag memory determining which one of said first or second value areas is capable of being enabled into a non-volatile state for reading out and counting but is inhibited for charging,
         the other respective first or second value area is temporarily only capable of being enabled into a volatile state for charging, and
         at each point in time only one of said first or second value areas is enabled.

2. The data transfer system according to claim 1, wherein said selection logic circuit receives a charging control signal effecting a temporary activation of said first or second value area not capable of being enabled into a non-volatile state and temporarily deactivating said value area capable of being enabled into the non-volatile state.

3. The data transfer system according to claim 2, wherein said at least one portable data carrier configuration includes an enabling device allowing generation of the charging control signal only after a positive authentication of said at least one terminal.

4. The data transfer system according to claim 3, wherein said non-volatile flag memory receives a programming signal initiating a transformation of said temporarily activating said first or second value area into said first or second value area capable of being enabled into a non-volatile state.

5. The data transfer system according to claim 4, wherein said at least one portable data carrier configuration includes another enabling device allowing generation of the programming signal only after a positive authentication of said at least one terminal.

6. The data transfer system according to claim 5, wherein said non-volatile semiconductor memory has an enabling area acting as a non-volatile counting device and in which every attempt to accomplish the enabling is registerable in a nonvolatile state and is distinguishable from successive enabling procedures.

7. The data transfer system according to claim 3, wherein said non-volatile semiconductor memory has an enabling area acting as a non-volatile counting device and in which every attempt to accomplish the enabling is registerable in a nonvolatile state and is distinguishable from successive enabling procedures.

8. The data transfer system according to claim 1, including a switching device connected between said selection logic circuit and said non-volatile memory, a programming logic circuit connected to said switching device, and a verifying logic circuit connected to said switching device, said switching device connecting said programming logic circuit and said verifying logic circuit to said respectively active value area as a function of at least one output signal of said selection logic circuit.

9. In a method for using a terminal of a data transfer system to recharge a portable data carrier configuration including a non-volatile semiconductor memory having a first value area acting as a first counter and representing a debitable monetary value and a second value area acting as a second counter, a selection logic circuit connected to the first and second value areas, and a non-volatile flag memory connected through the selection logic circuit to the first and second value areas and assuming only two states, the improvement which comprises:
   a) reading an old counter status of a first or second value area having been enabled into a non-volatile state from the portable data carrier configuration with the terminal;
   b) calculating a new counter status in the terminal from the old counter status and data to be credited having been input into the terminal;
   c) transferring the new counter status from the terminal to the portable data carrier configuration;
   d) writing the new counter status into the first or second value area of the non-volatile memory having been activated only into a volatile state by a charging control signal; and
   e) altering the state of the flag memory so that the first or second value area with the new counter status becomes capable of being enabled into a non-volatile state.

10. The method according to claim 9, which comprises carrying out the following steps after step d):
   d1) signing the new counter status in the portable data carrier configuration and transferring the signature to the terminal;
   d2) determining the signature of the new counter status in the terminal and comparing of the two signatures; and
   carrying out step e) only after the two signatures match and abnormally terminating the method if the two signatures do not match.

11. The method according to claim 10, which comprises carrying out the following steps after step d2):
   d3) reading data specific for the portable data carrier configuration from the portable data carrier configuration, with the terminal;
   d4) generating a challenge and determining a response in the terminal from the challenge and at least some of the specific data and the old counter status;
   d5) transmitting the challenge and the response by the terminal for the portable data carrier configuration;
   d6) determining a response from the challenge in the portable data carrier configuration and comparing the two responses; and
   proceeding with step e) only if the two responses match and abnormally terminating the method if they do not match.

12. The method according to claim 11, which comprises using a datum altering with every charging operation for signing a counter status or for generating a response, and generating a signature or a response with a pseudo-random generator.

13. The method according to claim 12, which comprises outputting the datum as a value of a charging counter counting every charging operation.

14. The method according to claim 12, which comprises outputting the datum as a value of a signature memory to which the signature of the old value of the first or second value area which is respectively capable of being enabled into a non-volatile state, is written.

15. The method according to claim 12, which comprises outputting the datum as a value of a signature memory into which a new value is written through the charging terminal as the signature of the charging operation in the case of every new charging operation.

16. The method according to claim 12, which comprises altering a response counter into a non-volatile state and using the non-volatile state as the altering datum, before every response calculation.

17. The method according to claim 10, which comprises using a datum altering with every charging operation for signing a counter status or for generating a response, and generating a signature or a response with a pseudo-random generator.

18. The method according to claim 17, which comprises outputting the datum as a value of a charging counter counting every charging operation.

19. The method according to claim 17, which comprises outputting the datum as a value of a signature memory to which the signature of the old value of the first or second value area which is respectively capable of being enabled into a non-volatile state, is written.

20. The method according to claim 17, which comprises outputting the datum as a value of a signature memory into which a new value is written through the charging terminal as the signature of the charging operation in the case of every new charging operation.

21. The method according to claim 17, which comprises altering a response counter into a non-volatile state and using the non-volatile state as the altering datum, before every response calculation.

22. The method according to claim 9, which comprises carrying out the following steps after step a):

a1) reading data specific for the portable data carrier configuration from the portable data carrier configuration, with the terminal;

a2) generating a challenge and determining a response in the terminal from the challenge and at least some of the specific data and the old counter status;

a3) transmitting the challenge and the response by the terminal for the portable data carrier configuration; and a4) determining a response from the challenge in the portable data carrier configuration and comparing the two responses.

23. The method according to claim 22, which comprises using a datum altering with every charging operation for signing a counter status or for generating a response, and generating a signature or a response with a pseudo-random generator.

24. The method according to claim 23, which comprises outputting the datum as a value of a charging counter counting every charging operation.

25. The method according to claim 23, which comprises outputting the datum as a value of a signature memory to which the signature of the old value of the first or second value area which is respectively capable of being enabled into a non-volatile state, is written.

26. The method according to claim 23, which comprises outputting the datum as a value of a signature memory into which a new value is written through the charging terminal as the signature of the charging operation in the case of every new charging operation.

27. The method according to claim 23, which comprises altering a response counter into a non-volatile state and using the non-volatile state as the altering datum, before every response calculation.

28. The method according to claim 9, which comprises carrying out the following steps after step d):

d1) reading data specific for the portable data carrier configuration from the portable data carrier configuration, with the terminal;

d2) generating a challenge and determining a response in the terminal from the challenge and at least some of the specific data and the old counter status;

d3) transmitting the challenge and the response by the terminal for the portable data carrier configuration;

d4) determining a response from the challenge in the portable data carrier configuration and comparing the two responses; and proceeding with step e) only if the two responses match and abnormally terminating the method if they do not match.

29. The method according to claim 28, which comprises using a datum altering with every charging operation for signing a counter status or for generating a response, and generating a signature or a response with a pseudo-random generator.

30. The method according to claim 29, which comprises outputting the datum as a value of a charging counter counting every charging operation.

31. The method according to claim 29, which comprises outputting the datum as a value of a signature memory to which the signature of the old value of the first or second value area which is respectively capable of being enabled into a non-volatile state, is written.

32. The method according to claim 29, which comprises outputting the datum as a value of a signature memory into which a new value is written through the charging terminal as the signature of the charging operation in the case of every new charging operation.

33. The method according to claim 29, which comprises altering a response counter into a non-volatile state and using the non-volatile state as the altering datum, before every response calculation.

* * * * *